United States Patent [19]

Blank et al.

[11] Patent Number: 5,091,455
[45] Date of Patent: Feb. 25, 1992

[54] POLYURETHANE-POLY (VINYLCHLORIDE) INTERPENETRATING NETWORK

[75] Inventors: Norman E. Blank, Heidelberg, Fed. Rep. of Germany; RIchard C. Hartwig, Laurel; Cung Vu, Gaithersburg, both of Md.

[73] Assignee: W. R. Grace & Co.-Conn., New York, N.Y.

[21] Appl. No.: 550,236

[22] Filed: Jul. 10, 1990

Related U.S. Application Data

[63] Continuation of Ser. No. 141,451, Jan. 7, 1988, abandoned.

[51] Int. Cl.$^5$ ............... C08K 3/26; C08L 75/04
[52] U.S. Cl. ............... 524/297; 524/425; 524/507; 525/131; 525/903
[58] Field of Search ........... 525/131, 903; 524/507, 524/297, 425

[56] References Cited

U.S. PATENT DOCUMENTS

| | | | |
|---|---|---|---|
| 3,210,439 | 10/1965 | Aitken et al. | 525/131 |
| 3,700,752 | 10/1972 | Hutchinson | 525/454 |
| 4,302,553 | 11/1981 | Frisch | 525/58 |
| 4,722,969 | 2/1988 | Huynh-Tran | 525/129 |

FOREIGN PATENT DOCUMENTS

| | | | |
|---|---|---|---|
| 0005357 | 1/1983 | Japan | 525/131 |
| 1120820 | 6/1986 | Japan | 525/131 |
| 2001715 | 1/1987 | Japan | 525/131 |

OTHER PUBLICATIONS

Pernice, J., Frisch, K. C., and Navare, R., Cellular Plastics, 18(2), 121-128.
Chem. Abs. 103(4): 2315/r.
Garcia D., J. Polym. Sci., Part B: Polym. Phys., 24(7), 1577-86.
Gifford, K. R., Moore, D. R., and Pearson, R. G. (Chem. Abs. 94(12): 85402w.).

Primary Examiner—Ana L. Carrillo
Attorney, Agent, or Firm—Charles A. Cross

[57] ABSTRACT

Interpenetrating network polymers (IPN's) are made by admixing polyols, polyisocyanate, and a poly(vinylchloride) plastisol, followed by heating to complete the cure. The resulting polyurethane/poly(vinylchloride) IPN has superior properties as sealant, especially for automotive parts.

12 Claims, No Drawings

POLYURETHANE-POLY (VINYLCHLORIDE) INTERPENETRATING NETWORK

This is a continuation of application Ser. No. 141,451, filed Jan. 7, 1988 now abandoned.

REFERENCE TO RELATED APPLICATION

Polyurethanes similar to those used in Example 1 herein are described and claimed in U.S. application having Ser. No. 101,215, now U.S. Pat. No. 4,804,734 filed Sept. 25, 1987, inventors Vu et al.

FIELD OF THE INVENTION

The invention relates to a composition consisting of interpenetrating polymeric networks (IPN's), and to a method for making the composition.

BRIEF DESCRIPTION OF THE INVENTION

A polyurethane (PU) network is formed that contains, within its interstices and reticula, discrete particles of a poly(vinyl chloride) plastisol (PVC). This resin composite is heated to cure the PVC, thereby forming a PVC network that interpenetrates the PU network. The result is a PU/PVC IPN.

According to the literature, "IPN's are polymer alloys consisting of two or more distinct crosslinked polymer networks held together by permanent entanglements with only accidental covalent bonds between the polymers". Pernice, J.; Frisch, K. C.; and Navare, R., Cellular Plastics, 18(2), 121-128.

BACKGROUND OF THE INVENTION AND PRIOR ART

Mixing or blending of preformed PU with various preformed polymers (epoxies, polyacrylates, poly(acrylonitrile-butadiene), polystyrene, etc.) are known. See, e.g., U.S. Pat. No. 4,302,553, to Frisch et al. Chem. Abs. 103(4): 23157r discloses a blend of preformed PU/PVC. A physical blend of PU/PVC is also disclosed in Garcia, D., J. Polym. Sci., Part B: Polym. Phys., 24(7), 1577-86.

Thermoplastic PU's melt-blended with PVC in a Banbury mixer are reported by Gifford, K. R.; Moore, D. R.; and Pearson, R. G. (Chem. Abs. 94(12): 85402w.) See also Khachatryan, P. M. et al, Chem. Abs. 105(16): 134778e.

Physically blending a preformed PU with a pregelled PVC cannot possibly achieve the degree of interpenetration obtained in our method.

Pernice et al, supra, make an IPN by reacting (I) a mix of poly(oxypropylene) triol, ethylene oxide capped and grafted with acrylonitrile, and a mixture of short chain diols with (II) an isocyanate (a "modified MDI") in admixture with (III) a preformed epoxy. A PU network is said to be formed within the epoxy network.

We point out certain distinctions between our IPN and those of the prior art: We do not mix together a PU resin with a pregelled PVC as starting materials. That is to say, we do not take a preformed PU and blend it with a pregelled PVC, or vice versa. Nor do we have a solvent or emulsion system. Nor do we form both networks simultaneously. Nor do we have a PU film overlaid by a PVC film, or vice versa. Finally, our PVC must initially be in the form of a plastisol. "Plastisols are produced by dispersion of a fine particle size PVC resin in plasticizer." —Sarvetnick, Harold A., Polyvinyl Chloride, p. 173.

DETAILED DESCRIPTION OF THE INVENTION

We start with two components. One component ("Component A") comprises one or more polyols, the other ("Component B"), a polyisocyanate. These two ingredients are selected such that, on bringing them together in the presence of a PU catalyst, a PU will immediately begin to form. Either component can contain the catalyst. As regards the PVC plastisol, either component can contain this ingredient. We prefer that it be admixed into the polyol composition.

We now mix the two components, A and B (e.g., by spraying or extruding), and the formation of the IPN begins. It forms in two steps.

In Step 1 most (typically 90%) of the PU network forms. This happens immediately after mixing. At this point the PVC plastisol lies dispersed as discrete prepolymeric particles within the reticula of the PU network, substantially unchanged from their original form. This initial PU network is crucial to the invention. It forms a firm framework, or skeleton, that ensures a "uniform" configuration or dispersion of the forthcoming PVC network. At this point the IPN achieves sufficient initial strength to form a sealant/adhesive coating layer.

In Step 2 the PU/PVC mix is heated at a temperture and for a time necessary to cure the PVC plastisol, i.e., convert it from a sol to a gel. These conditions for curing a PVC plastisol are well known to those skilled in the art and are discussed hereinafter. In this second step the particles of the PVC plastisol join up with each other in the known way from a sol to a gel, to form their own network, and the result is two interpenetrating polymers, a PU/PVC IPN. Any residual polyol and isocyanate also react during this curing operation, thereby completing PU network formation, and giving the IPN its full ultimate mechanical strength. As with any IPN system, during curing a great deal of branching and crosslinking takes place, both of which may be aided (if desired) by addition of conventional chain extenders and crosslinkers.

The individual ingredients will now be further described.

THE PU SYSTEM

As already mentioned, the polyol(s) and polyisocyanate(s) must be chosen so that they will react quickly to form the requisite initial PU network when they are brought together. This requires not only active ingredients but also an active catalyst system. This initial PU network helps to hold the particles of the PVC plastisol in uniform suspension until they can form their own polymeric network in Step 2. There are a number of polyol-polyisocyanate systems that will operate to form such PU network. A preferred system is described elsewhere herein.

The polyols and polyisocyanates used in this invention are critical only in the sense that they must react on mixing to form the initial polyurethane network skeleton, which must be one that will then foster the formation of a secondary PVC network to give an IPN of desirable properties. At the outset this requirement necessitates a solventless formulation. Further, the polyol mixture preferably includes a low-molecular weight polyol, such as glycerol, plus a higher molecular weight diol and/or triol, all as hereinafter described.

A preferred polyol mixture for inclusion in Component A comprises: (i) a major amount of a polypropylene-oxide based polyether triol containing only secondary hydroxyl groups with an average molecular weight in the range of about 500 to 3,000, and preferably about 1,000; available commercially, e.g., as NIAX-LG-168 from Union Carbide Corp., and herein indicated as "PPT"; and (ii) a low-molecular weight polyol with at least three hydroxyl groups and a molecular weight between 92 and about 200.

Other high molecular weight polyols can be used instead of, or in addition to, the above mentioned triol. One such is a polyether diol based on propylene oxide and containing only secondary hydroxyl groups; average molecular weight can vary in the range 400 to 8,000 and is preferably about 1,000; available commercially from various sources, e.g., as PPG-1025 from Union Carbide Corp.

Suitable low-molecular weight polyols include glycerol, butanetriol-1,2,3; trimethylolethane; pentaglycerol; erithritol, trimethylolpropane; pentarythritol; triethanolamine; and triethanolpropane.

The catalyst is suitably mixed in with the polyols. There are a number of catalyst systems available. A system of particular value is a mixture of dibutyl tin dilaurate (DBTDL) with triethylenediamine (DABCO), preferably in equal weights. Other catalysts include those listed below.

THE CATALYST

Substantially, any of the conventional polyurethane catalysts (and combinations) can be used.

These catalysts include:
Tertiary amines:

Triethylene diamine
N-methyl morpholine
N-ethyl morpholine
Diethyl ethanolamine
1-methyl-4-dimethylamino ethyl piperazine
3-methoxy-N-dimethyl propyl amine
N-dimethyl-N'-methyl isopropyl propylene diamine
N,N-diethyl-3-diethyl amino propylamine
N,N-dimethyl benzyl amine
Dicyclohexylmethylamine
2,4,6-tris dimethylaminomethylphenol
N,N-dimethyl cyclohexylamine
Triethylamine
Tri-n-butylamine
1,8-diaza-bichloro[5,40]-undecene-7
N-methyl diethanolamine
N,N-dimethyl ethanolamine
N,N-diethyl cyclohexylamine
N,N,N'N'-tetramethyl-ethylene diamine
1,4-diaza-bicyclo-[2,2,2]-octane
N-methyl-N'-dimethylaminoethyl-piperazine
bis-(N,N-diethylaminoethyl)-adipate
N,N-diethylbenzylamine
Pentamethyldiethylene triamine
N,N,N',N'-tetramethyl-1,3-butanediamine
1,2-dimethylimidazole
2-methylimidazole Tin compounds:

Stannous chloride
Dibutyl tin di-2-ethyl hexoate
Stannous octoate
Dibutyl tin dilaurate
Trimethyl tin hydroxide
Dimethyl tin dichloride
Dibutyl tin diacetate
Dibutyl tin oxide
Tributyl tin acetate
Tetramethyl tin
Dimethyl dioctyl tin
Tin ethyl hexoate
Tin laurate
Dibutyl tin maleate
Dioctyl tin diacetate Other metal organics:

Zinc octoate
Phenyl mercuric propionate
Lead octoate
Lead naphthenate
Copper naphthenate As to the amount of catalyst(s), the preferred amount of tertiary amine catalyst is about 0.01 to 3%, based on the total weight of polyols plus polyisocyanate. When using a tin compound or other metal-containing catalyst, an equal amount is suitable. Mixtures of tertiary amines and organo-metallics are particularly suitable as catalysts for this invention.

The preferred polyisocyanate for use with the above described polyol mixture is a modified MDI (diphenylmethane-4,4'-diisocyanate). A preferred modified MDI is available as PAPI-94 from Dow Chemical Co. The latter product is described as being a mixture of 2 isomers, viz., 98% diphenylmethane-4,4'-diisocyanate and 2% diphenylmethane-4,2'-diisocyanate, and as having a functionality of 2.3, isocyanate equivalent weight of 131, NCO content by weight 32%, average molecular weight 290, and a high ortho,para isomer level.

An MDI modified in such way that it has a functionality of about 2 to 3, an isocyanate equivalent weight of about 100 to 300, and an NCO content of about 15 to 50% is particularly useful.

A number of other useful polyisocyanates are given in the following list. If desired, they can be converted into prepolymers in the known way.

A wide variety of isocyanates is useful in the invention, viz.:

Diisocyanates such as hexamethylene diisocyanate, m-phenylene diisocyanate, 2,4-toluene diisocyanate, 4,4'-diphenylmethane diisocyanate, dianisidine diisocyanate, tolidine isocyanate, isophorone diisocyanate, 4,4'-dicyclohexylmethane, chlorophenylene-2,4-diisocyanate, 1,5-naphthalene diisocyanate, ethylene diisocyanate, diethylidene diisocyanate, propylene-1,2-diisocyanate, cyclohexylene-1,2-diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, and furfurylidene diisocyanate.

Triisocyanates such as biuret of hexamethylene diisocyanate and triphenylmethane triisocyanate.

Polyisocyanates such as polymeric diphenylmethane diisocyanate.

A preferred polyurethane formulation is given below. This formulation is used in the examples (1 and 2).

| Polyurethane Component | |
|---|---|
|  | Parts by Weight |
| Component A | |
| Polyols | |
| PPT | 100 |
| Glycerol | 8.1 |
| Catalysts | |
| DBTDL | 0.04 |
| DABCO | 0.04 |
| Component B | |
| Isocyanate | |
| PAPI-94 | 69 |

THE PVC PLASTISOL

A number of PVC plastisols are available for use in the invention. A preferred plastisol is described below as PVC-1.

| PVC-1 | |
|---|---|
| Component | Parts by Weight |
| PVC resin (100% homopolymer)[1] | 30 |
| Dioctyl phthalate plasticizer | 60 |
| Powdered calcium carbonate filler | 30 |

[1] As Vestolit E-7031, from Huels, West Germany

Other PVC plastisols differ from PVC-A above principally in the type and amount of plasticizer, which is selected for its effect on viscosity and stability. Emulsifiers may also be added to reduce viscosity, while a mineral filler may be added to increase viscosity. Most formulations contain some type of stabilizer to accommodate extended storage, and a variety of adhesion promoters.

Our invention contemplates PVC plastisols with different levels of PVC.

Another good PVC plastisol is:

| PVC-2 | |
|---|---|
| Component | Parts by Weight |
| PVC resin (5% vinyl acetate, 95% vinyl chloride, co-polymer)[2] | 30 |
| Dioctyl phthalate plasticizer | 60 |
| Powdered calcium carbonate filler | 30 |

[2] As Vestolit E-7091 from Huels, West Germany

Owing to the rapidity with which the PU network forms, it is necessary that the PVC plastisol be premixed into either the polyol or the polyisocyanate component (i.e., A or B). We prefer premixing it into the A component. This premixing can be carried out in any mixing equipment that will provide thorough homogeneous blending. In the laboratory, a 1 gallon Ross mixer is suitable. For production work, a Nauta mixer or Drais mixer can be used.

MIXING COMPONENTS A AND B AND APPLICATION

For small batches, A and B can be mixed in an open container at room temperature. Reaction occurs very quickly, and the resulting mixture can then be spread on a substrate, using roller or like applicator, and it forms the desired polyurethane resin on the substrate. For production work (and the IPN is designed for this) a 2-component coating or sealant dispensing unit gives best results.

Application is suitably made at room temperature, though the two components can be applied at higher temperatures, if desired, e.g., anything under the cure point of the PVC plastisol.

PROPORTIONS

The amounts of ingredients are selected so as to conform to the following ranges:

(1) The weight ratio of the PVC plastisol to the overall amount of polyurethane formed (calculated as total polyols plus polyisocyanate) should be about 0.1–2.0 to 1, and preferably about 0.5–1.0 to 1. Such ratio will be substantially retained in the ultimate IPN.

(2) The weight ratio of the overall amount of polyols to polyisocyanate should be about 1–5 to 1, and preferably about 2–3 to 1.

(3) The weight ratio of other polyol(s) to low-molecular weight polyol should be about 4–100 to 1, preferably 6–40 to 1.

(4) The amount of polyurethane catalyst should be about 0.01–3 weight % of the total amount of polyols and polyisocyanate, and preferably 0.1 to 1%.

Although the examples use only polyols (glycerol and PPT), we have made excellent IPN's with 3 polyols, e.g., with glycerol, PPT, and Union Carbides's PPG-1025.

PVC-1 or PVC-2 (as above described) was blended with Component A (as above described). The weight ratio of PVC plastisol to total weight of the two-component PU was 1:10. This ratio can vary over the range of 10–150:100. After mixing and application, but before curing, all samples were found to have high initial strength. Upon curing at 140° C. for 30 minutes, all samples were found to have high final strength which demonstrated their utility as sealants or adhesives. Properties are given in TABLE I.

TABLE I

|  | Tensile Modulus, psi | Tensile Stress, psi | Elongation at Failure, % | Shore A Harness |
|---|---|---|---|---|
| Example 1 | | | | |
| PU + PVC-1 | | | | |
| uncured | 3630 | 271 | 19.3 | 80 |
| cured | 4040 | 314 | 29.7 | 82 |
| Example 2 | | | | |
| PU + PVC-2 | | | | |
| uncured | 2760 | 164 | 15.7 | 67 |
| cured | 4030 | 212 | 28.5 | 74 |
| Comparisons | | | | |
| PU alone (cured) | 5710 | 1380 | 125 | 91 |
| PVC-1 | 292 | 43.9 | 136 | 22 |
| PVC-2 | 171 | 67.6 | 133 | 14 |

EXPLANATION OF THE TABLE

PU is the preferred polyurethane formulation, made from A+B, as above given. PVC-1 and PVC-2 are the PVC formulas above stated. Mixing all components in the manner above described, without heating, whereby the PU is formed quickly by reaction of polyols and polyisocyanate, gives an immediate solid, and this solid furnishes the "uncured" values in the TABLE. Heating at 140° C. for 30 minutes to cure the PVC (and any uncured PU) completes the PU/PVC IPN, and the cured IPN provides the "cured" values in the TABLE.

Tensile modulus, tensile stress, and elongation at break are per ASTM D 638 (1978).

The data in the TABLE show what we achieved. PU alone has high tensile modulus, which is good (for our automotive sealant uses), but tensile stress and elongation at failure are unacceptably high. PVC alone has very low tensile stress, and the failure elongation is far too great; also, cured PVC is too soft. Our PU/PVC IPN, on the other hand, is just righ as an automotive sealant. The tensile (modulus and stress), elongation at failure, and hardness make them excellent candidates for such uses.

Various conventional materials which are inert to the formation of both the polyurethane resin network and the PVC network can be added, e.g., thixotropic agents, anti-oxidants, antiblistering agents, reinforcing agents (fibers, platelets, crosslinkers, latexes), thickeners, plasticizers, adhesion promoters, UV stabilizers, powdered pigments, fumed silica, barytes, carbon black, titanium dioxide, and the like; pigment dispersants; corrosion inhibitors, and so on. These materials can be added to A, to B, or to the mix of A and B, in amounts ranging from about 0.01 to 25% by weight of the total mix.

USES

The PU/PVC IPN's of this invention are useful as sealants and adhesives. They find particular utility in automobile assembly lines and body shops, e.g., as hinge sealers (doors, hood, trunk), seam sealers, antiflutter cushions, drip rail sealers, and like substrates. The IPN may be bonded to one substrate or may be applied as a lamelar bonding between substrates. Such uses require wash-off resistance, adhesion to oily steel, flexibility, paintability, E-coat processibility, corrosion resistance, and other qualities.

Certain of these uses are discussed in more detail below.

ANTI-FLUTTER BAR

Sealants for some automotive uses may seem to present a paradox. The hood anti-flutter bar may be taken as an example. In many automobiles the hood is reinforced by a metal piece, the anti-flutter bar, generally X-shaped, that extends across the hood interior. This anti-flutter bar is spot-welded to the hood, but the edge seal is not tight. A small crevice (cleft, crack, or fissure) is left, either deliberately or as the inherent result of the mode of fastening the bar to the hood. This space, which runs the entire periphery of the anti-flutter bar, has to be filled in and painted over. It is customarily filled with polymer. When properly performed, this sealant operation enhances the function of the anti-flutter bar. That is to say, it dampens hood vibration that might lead to fluttering. To accomplish this the sealant must provide several contradictory functions simultaneously. It must be tough and hard, yet not too hard. It must be able to stretch, yet it must not stretch excessively, for excessive stretching would crack the overlying paint and start corrosion. Also, if the sealant stretches too much, it tends to lose its ability to resist vibration. The IPN's of this invention are believed to possess the proper assortment of properties needed as an anti-flutter bar sealant.

AUTOMOBILE WHEEL COVER

Wheel covers are often manufactured in two or more pieces. For example, there may be a rugged foundation piece that fastens directly to the wheel, and an ornamental cover is spot-welded to the foundation piece, covering the lugs but leaving access to the air valve. Again, the mode of fastening generally leaves a gap between the two pieces, and this gap or fissure is commonly filled with a sealant to prevent entry of water, road salt, etc. If the sealant is skillfully chosen, it will also dampen road vibration that tends to tear the ornamental cover from the foundation cover. Here again, a specific assortment of sealant properties is aimed at: the sealant should be adherent and tough. But it must also be flexible, yet not too flexible. It must be stress resistant, yet provide a certain amount of recoverable deformation. We believe our IPN's met these requirements.

Although our IPN's demonstrate their sealant/adhesive properties best under vibratory conditions (such as in automotive and other vehicular construction), they are also useful as simple sealants in non-food containers (e.g., cans for oils, greases, herbicides, tennis balls, hardware parts, etc.)

We have tried certain commercially available PVC's that give such IPN's. For example, cured IPN's made of polyurethane and two European PVC's (3 and 4) had the following properties:

|  | 3 | 4 |
|---|---|---|
| Tensile modulus, psi | 3,460 | 3,450 |
| Tensile stress, psi | 781 | 937 |
| Failure elongation, % | 65.8 | 72.2 |
| Shore A hardness | 80 | 85 |

These IPN's would be equivalent to the formulations given in Examples 1 and 2 in the TABLE.

We claim:

1. A two-step process, steps (A) and (B), for forming an interpenetrating polymeric network of distinct polyurethane and poly(vinyl chloride) networks wherein step (A) comprises mixing together
   (i) a polyol component,
   (ii) a polyisocyanate component,
   (iii) a polyurethane catalyst, and
   (iv) a plastisol comprising plasticizer and poly(vinyl chloride);
wherein (i)–(iv) are present in a sufficient amount that the ratio of plastisol to polyurethane formed is in the range of about 0.1–2.0 and wherein at room temperature step (A) results in the formation of an initial partially cured polyurethane network holding the plastisol in uniform dispersion; and step (B) comprises heating the initial system to a poly(vinyl chloride) curing temperature to complete the cure of the polyurethane network and to cure the plastisol whereby the network resulting from the plastisol interpenetrates and is distinct from the polyurethane network.

2. Process according to claim 1 wherein the polyol component (i) comprises a low-molecular weight polyol with at least three hydroxyl groups and a molecular weight molecular weight in the range of about 92 to 200 and a poly(oxypropylene) triol having a number average molecular weight in the range of about 500 to 3,000 and the polyisocyanate component (ii) comprises diphenylmethane-4,4'-diisocyanate.

3. Process according to claim 2 wherein the polyurethane catalyst is a mixture of equal amounts of dibutyl tin dilaurate and triethylene diamine.

4. Process according to claim 1 wherein the plastisol comprises poly(vinyl chloride), dioctyl phthalate plasticizer, and calcium carbonate filler.

5. Process according to claim 4 wherein the poly(vinyl chloride) is a copolymer, 5% vinyl acetate and 95% vinyl chloride.

6. Process according to claim 1 wherein in step (A) the polyol component (i) comprises, in parts by weight, poly(oxypropylene) triol having a molecular weight of about 1,000, about 100 parts; glycerol, about 8 parts; the polyisocyanate component (ii) comprises 69 parts by weight of a diphenylmethane diisocyanate mixture comprising 98% diphenylmethane-4,4'-diisocyanate and 2% diphenylmethane-4,2'-diisocyanate; plastisol (iv) comprises 30 parts poly(vinyl chloride) and 60 parts dioctyl phthalate plasticizer; and wherein step (B) comprises heating the mixture from (A) to 140° C.

7. Process according to claim 6 wherein the poly(vinyl chloride) in plastisol (iv) comprises a copolymer, 5% vinyl acetate and 95% vinyl chloride.

8. The product of the process according to claim 1.

9. A solventless composition consisting essentially of:
   (i) a polyol component,
   (ii) a polyisocyanate component,
   (iii) a polyurethane catalyst, and
   (iv) a plastisol comprising plasticizer and poly(vinyl chloride);
wherein at room temperature said composition forms a partially cured polyurethane network; wherein when heated to a poly(vinyl chloride)-curing temperature, the polyurethane network is completely cured and a poly(vinyl chloride) network which is distinct from the polyurethane network forms; and wherein said (i)–(iv) are present in a sufficient amount that the ratio of plastisol to polyurethane formed is in the range of about 0.1–2.0

10. A solventless composition according to claim 9 wherein the polyol component (i) comprises a low molecular weight polyol having at least three hydroxyl groups and a number average molecular weight in the range of 92 to 200 and a poly(oxypropylene) triol having a number average molecular weight in the range of about 500 to 3000.

11. A solventless composition according to claim 9 wherein the polyol component comprises glycerol and a poly(oxypropylene) triol having a number average molecular weight of about 1000.

12. A solventless composition according to claim 9 wherein the polyisocyanate component (ii) comprises diphenylmethane-4,4'-diisocyanate.

* * * * *

UNITED STATES PATENT AND TRADEMARK OFFICE
CERTIFICATE OF CORRECTION

PATENT NO. : 5,091,455

DATED : February 25, 1992

INVENTOR(S) : Norman E. Blank, Richard C. Hartwig, Cung Vu

It is certified that error appears in the above-identified patent and that said Letters Patent is hereby corrected as shown below:

Column 8, lines 57-58, Claim 2: delete "molecular weight molecular weight" and add -- number average molecular weight--

Signed and Sealed this

First Day of June, 1993

Attest:

MICHAEL K. KIRK

Attesting Officer  Acting Commissioner of Patents and Trademarks